United States Patent
Rieck et al.

(10) Patent No.: US 6,178,927 B1
(45) Date of Patent: Jan. 30, 2001

(54) GAS ENGINE

(75) Inventors: Kai Rieck, Augsburg; Robert Glauber, Friedberg; Klaus Lierz, Gersthofen; Thomas Felber, Augsburg; Lars Dier, deceased, late of Rückersdorf, all of (DE), by Hans-Joachim Dier, Evi-Brigitte Dier, legal representatives

(73) Assignee: MAN B&W Diesel Aktiengesellschaft, Augsburg (DE)

( * ) Notice: Under 35 U.S.C. 154(b), the term of this patent shall be extended for 0 days.

(21) Appl. No.: 09/261,856

(22) Filed: Mar. 3, 1999

(30) Foreign Application Priority Data

Mar. 3, 1998 (DE) .............................................. 198 08 829

(51) Int. Cl.⁷ .............................. F02D 43/00; F02P 5/152
(52) U.S. Cl. ............................... 123/27 GE; 123/406.29; 123/406.45; 123/435; 123/526
(58) Field of Search ........................ 123/27 GE, 406.29, 123/406.21, 406.45, 435, 526, 527

(56) References Cited

U.S. PATENT DOCUMENTS

| | | | |
|---|---|---|---|
| 4,376,429 | * 3/1983 | Youngblood | 123/406.21 |
| 5,224,457 | * 7/1993 | Arsenault et al. | 123/27 GE X |
| 5,333,591 | 8/1994 | Korsmeier et al. | 123/527 |
| 5,887,566 | * 3/1999 | Glauber et al. | 123/27 GE X |

OTHER PUBLICATIONS

Schiffgens et al., "Einfluss der Methanzahl auf die Verbrennung im Gas–Ottomotor" in *Motortechnischen Zeitschift* 54, 1993 pp. 350–357.

* cited by examiner

*Primary Examiner*—Tony M. Argenbright
(74) *Attorney, Agent, or Firm*—Cohen, Pontani, Lieberman & Pavane

(57) ABSTRACT

A gas engine has a control system having a pilot control device for adjusting the operating state of the engine in response to changes in limiting conditions that are monitored. The control system further includes a knock monitoring device which is superordinate with respect to the pilot control device when the operating state reach a minimum distance from the knocking limit of the gas engine. The knock monitoring device prevents the engine from being damaged from circumstance which can not be protected against via the pilot control device.

10 Claims, 1 Drawing Sheet

GAS ENGINE

BACKGROUND OF THE INVENTION

1. Field of the Invention

The invention relates a gas engine, especially a diesel gas engine, with a control system for controlling and regulating the gas engine in dependence on changing limiting conditions. More specifically, the invention relates to a gas engine with a pilot control device which receives measurements of the limiting conditions, calculates output signals, and transmits the output signals to activators which activate final control elements for adjusting the engine operating point to the changed limiting conditions.

2. Description of the Related Art

Modern gas engines that operate on the lean-burn principle are able to comply with the standards for NOx emissions (e.g., those based in Germany on T A Luft) without requiring exhaust gas after treatment, even at high mean pressures. One prerequisite for meeting the standards for NOx emissions is a lean gas-air mixture, which requires a high air-fuel ratio $\lambda$ in the combustion chamber (lean-burn method).

The engine must therefore be kept within a narrow operating range at all limiting conditions (ambient temperature, ambient pressures, gas qualities, etc.). The operating range is limited, on the one hand, by the knocking limit or toxic emissions standards and, on the other hand, by the lean-operation limit. Moreover, the operating range depends on the output, and within the possible operating range optimum efficiency is to be attained. These physical relationships apply for diesel gas engines based on the diesel gas principle as well as to pilot injection gas engines and spark ignition gas engines, in all cases with or without prechamber ignition.

Various methods of keeping the engine in the preestablished operating range are known from the prior art. These methods include knocking control, ignition failure control, $\lambda$ control, and methane measurement probes.

The use of these methods is disadvantageous in that their use is limited during changes in the limiting conditions. In addition, there are essential disadvantages due to the inherent physical principles of the methods of knocking control and ignition failure control.

For example, knocking control devices do not become active until the engine is already in knocking operation. However, the operating state bordering directly on the knocking limit places engines, especially engines with high mean pressures (>16 bar), under high mechanical and thermal stresses. Generally, the limits on NOx emissions cannot be complied with during knock-controlled operation. Similarly, ignition failure recognition devices cannot respond until actual ignition failure occurs. In such an operating state, however, a considerable loss in efficiency has already taken place.

During changes in limiting conditions such, for example, as fluctuations in the amount of methane or the charging air temperature/mixture temperature before the cylinder, the adjustment of the air-fuel ratio by $\lambda$-control ensures neither compliance with NOx emission standards (lean-operation limit) nor maintenance of a sufficient distance from the top limit.

Another important influence on the NOx emissions and knocking limit operating parameters is the properties of the combustible gas. Therefore, a sensor that detects the combustible gas properties may be used to control the engine operating parameters.

A prior art gas engine with a control and regulating system for controlling the gas engine in response to changes in the limiting conditions is known from the article "Influence of methane number on combustion in the spark ignition gas engine" [*"Einfluss der Methanzahl auf die Verbrennung im Gas-Ottomotor"*] in *Motortechnischen Zeitschift* 54 (1993), pp. 350 ff. A disadvantage of the control and regulating concept described in this article is that although the described pilot control device ensures compliance with desired emission limits by controlled operation in methane ranges wherein the knocking limit has not yet been reached, the control device does not prevent the engine from reaching the knocking limit or being driven into a knocking operation state.

SUMMARY OF THE INVENTION

An object of the present invention is to provide a gas engine with a control system for operating the gas engine reliably, i.e., free of knocking and ignition failure, at maximum attainable power with optimal efficiency while complying with the toxic emission limits, even during sharply changing limiting conditions.

This object is attained by the invention because the pilot control device is so embodied that, upon changes in the limiting conditions being detected by its sensors, the engine operating point is not permitted to come closer to the limits of the operating range than a defined minimum distance. In addition, the pilot control device is subordinated to a knock monitoring device in such a way that, when the operating point has reached the minimum distance from the knocking limit of the gas engine, the knock monitoring device adjusts the output of the engine or stops the engine.

The invention differs from existing solutions in that the pilot control device does not allow the gas engine to be driven at the limits of its operating range, but rather ensures that a safety distance from the limits is maintained. In addition, the pilot control device is subordinated to a knock monitoring device, so that engine damage can be avoided in circumstances that cannot be protected against via the pilot control device such as improper operation of the engine or the like.

According to the invention, the following advantages are attained: Critical operating states, such as running the engine at the knocking limit or the ignition failure limit, are avoided. As a result, thermal and mechanical stresses are kept low, operating reliability is increased and wear is reduced. Due to the flexibility of the control system, the engine can be automatically operated in a wide range of changing limiting conditions with maximum possible output, optimal efficiency and reliable compliance with toxic emission standards. The additional knock monitoring device according to the invention helps to avoid knocking damage that could occur due to parameters not monitored or not monitorable by the pilot control device.

In an especially advantageous embodiment, the knock monitoring device has a temperature sensor for measuring the combustion chamber temperature and forwarding the combustion chamber temperature to the knock monitoring device as an input signal. The knock monitoring device is embodied so as to directly generate a stop signal for the gas engine when a defined maximum combustion chamber temperature is exceeded. This measure is especially advantageous when knocking occurs suddenly and it is desirable to avoid dead times created by downstream regulating devices during which the engine could sustain damage.

In a further advantageous measure, the sensors assigned to the pilot control device include a temperature sensor that measures the charging air temperature and/or mixture temperature as an input signal of the pilot control device. This ensures that this important parameter for the output of the gas engine is detected by the pilot control device.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

Figure 1:
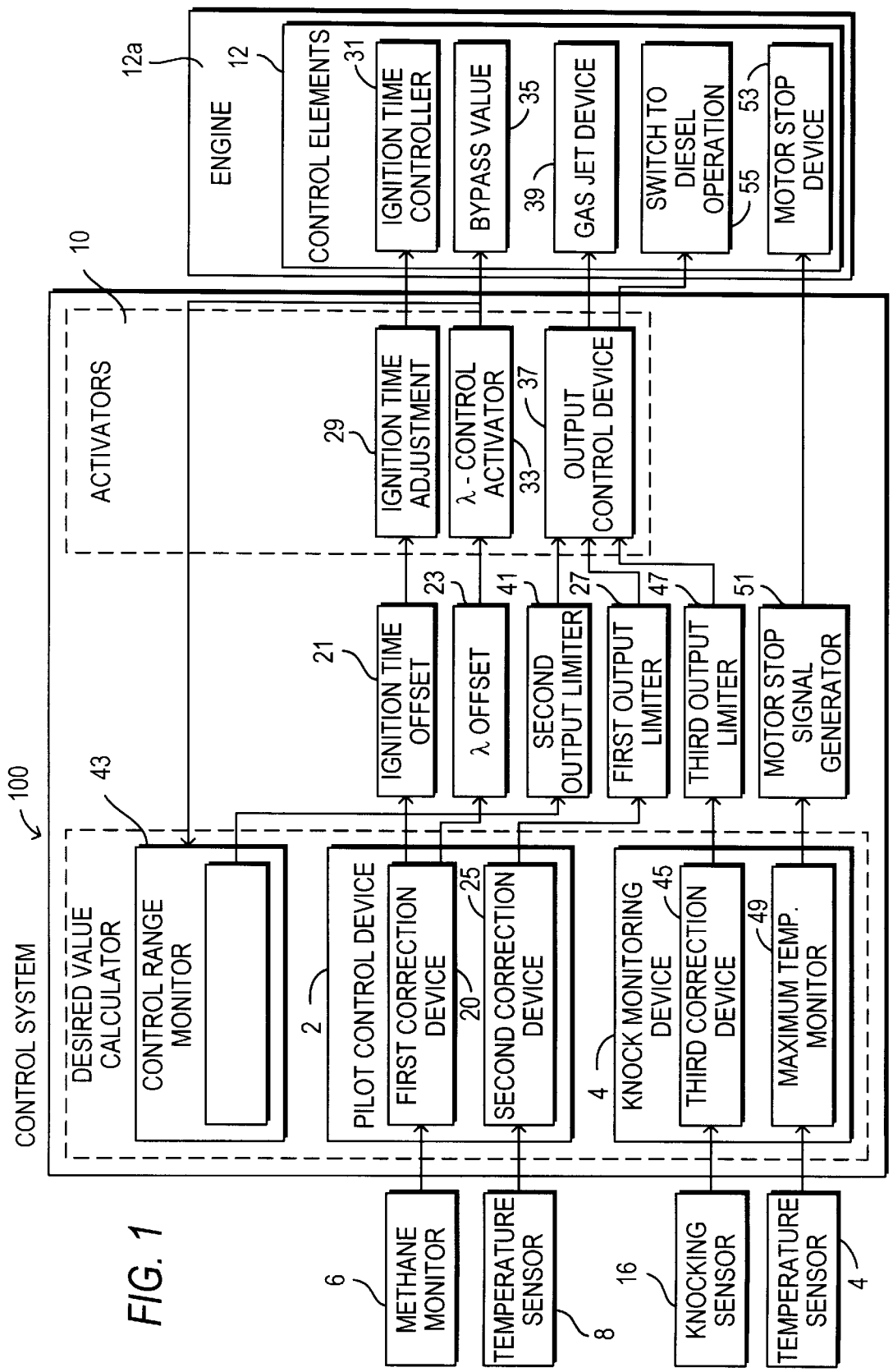
FIG. 1 shows a block diagram of an embodiment of a control and regulating system and a gas engine according to the present invention.

According to the preferred embodiment, a control system 100 for a diesel gas engine 12a is shown in FIG. 1 which comprises a pilot control device 2 and a knock monitoring device 4. The pilot control device 2 is connected to a methane monitor 6 which generates a signal corresponding to an amount of methane as an input to the pilot control device 2. In addition, the pilot control device 2 is also connected to a temperature sensor 8, which measures the charging air temperature and/or mixture temperature as an input signal of the pilot control device 2, depending on whether the engine 12a is supercharged.

As FIG. 1 shows, the pilot control device 2 comprises a first correction device 20 connected to the methane monitor 6 which outputs two methane amount correction signals. The first methane amount correction signal is transmitted to an ignition timing offset generator 21 which calculates a corresponding signal for the beginning of delivery or ignition timepoint offset as an output signal. The second methane amount correction signal is transmitted to an air-fuel ratio ($\lambda$) offset generator 23 which calculates an air-fuel ratio $\lambda$ offset signal for the air-fuel ratio $\lambda$ as a function of the amount of methane. In addition, the pilot control device 2 includes a second correction device 25 which generates a temperature correction signal that is transmitted to a first output limiter 27. An output limit signal for the gas engine 12a is calculated by the first output limiter 27 in dependence on the charging air temperature and/or mixture temperature measured by the temperature sensor 8.

The output signals of the ignition time offset generator 21, the $\lambda$ offset generator 23, and the output limiter 27 form target values for activators 10 which activate final control elements 12 of the gas engine 12a. The activators 10 of the gas engine preferably comprise an ignition time adjustment activator 29 that transmits the signal for the beginning of delivery to activate an ignition time controller device 31, a $\lambda$ control activator 33 that transmits the $\lambda$ offset signal to activate a bypass valve 35, and an output control device 37 for transmitting output limit signals to activate a gas jet device 39.

The pilot control device 2 is embodied according to the invention in such a way that, when changes in the limiting conditions are detected by the sensors 6, 8 of the pilot control device 2, the operating point of the engine 12a comes no closer to the limits of the operating range than a defined minimum distance. The result is that even during relatively large changes in the limiting conditions detected by the sensors 6, 8 of the pilot control device 2, operating states damaging to the engine 12a are never reached. Instead, a safe distance is maintained.

In an advantageous embodiment, the output of the engine 12a is further limited by a second output limiter 41 in response to the output of the $\lambda$ control activator 33 and a monitor 43 of the control range of the $\lambda$ control. The second output limiter 41 supercedes the pilot control device 2 when the $\lambda$ control activator 33 reaches the end of the adjustment range. As a result, the control range of the $\lambda$-control device 33 is moved into an area better suited to the current limiting conditions.

Limiting conditions not monitored in the pilot control device 2 are detected by a knock monitoring device 4 which is arranged to take priority over the pilot control device 2 when the operating point of the engine 12a reaches the defined minimum distance from the knocking limit such that the knock monitoring device 4 adjusts the engine output or stops the engine. The knock monitoring device 4 is connected to a temperature sensor 14, which measures the combustion chamber temperature, and a knocking sensor 16, which monitors data related to the knocking state of the gas engine, particularly solid-borne sound signals, combustion chamber pressure evaluations and combustion chamber temperature, and forwards these as input signals to the knock monitoring device 4. The knock monitoring device 4 includes a third correction device 45 that generates a knocking correction signal depending on the knocking state of the gas engine 12a. The knocking correction signal is transmitted to a third engine output limiter 47 which sets a target value for the output control device 37. As stated above, the output control device 37 activates a gas jet device 39. The knock monitoring device 4 also includes a maximum temperature monitor 49 connected to the temperature sensor 14. When a defined maximum combustion chamber temperature is exceeded, the maximum temperature monitor produces a stop signal for the gas engine at a motor stop signal generator 51. The motor stop signal activates a motor stop device 53 that stops the engine 12a.

The individual components of the control system 100 of the gas engine 12a may be combined in a total engine control system as a unit, or can be embodied in modular fashion and then connected with each other via suitable interfaces.

In addition, depending on the design and installation conditions of the gas engine, it may be possible to construct various combinations of the aforementioned input signals and output signals of the pilot control device 2 and the knock monitoring device 4.

The following example illustrates the function of the control system 100 for the gas engine 12a according to the invention for a diesel gas engine. The starting operating point is a high amount of methane and a low charging air temperature. After the starting point, the amount of methane drops and this drop is detected by the methane monitor. The pilot control device 2 reacts by generating two correction signals at the first correction device 20. The first correction signal is used to adjust the beginning of delivery or ignition time offset via the ignition time of delivery offset generator 21 such that the ignition time occurs later. The second correction signal is used to adjust the air-fuel ratio $\lambda$ via the $\lambda$ offset generator 23, as shown in FIG. 1. These adjustments enable coverage of a wide range of different gas qualities with full maximum output, while maintaining constant efficiency and constant NOx emissions.

If the amount methane drops further, the pilot control device 2 calculates a reduced permissible maximum output via the λ control device 33.

If the charging air temperature measured by temperature sensor 8 rises due, for example, to high ambient temperatures in summer, this may lead to knocking engine operation and increasing NOx emissions. Accordingly, the engine operating point would migrate toward the knocking limit. To counter this effect, the pilot control device 2 reduces the output via the output limiter 27 of the gas engine, and thereby avoids knocking.

Similarly, if the air throughput through the compressor drops due, for example, to changes in the limiting conditions, this would also lead to knocking engine operation and increasing NOx emissions.

However, if the changes in the limiting conditions are so great that they cannot be controlled by the pilot control device 2, the engine operating point may approach the knocking limit. The engine output is then limited via the knock monitoring device 4 in one or more steps, preferably two steps. Then, if the operating point of the gas engine is still located at the knocking limit, the engine 12*a* is stopped via the maximum temperature monitor 49 and the motor stop signal generator 51.

In the event that the operating point of the gas engine 12*a* suddenly nears or reaches the knocking limit, the combustion chamber temperature sensor 14 responds immediately, and the engine is immediately stopped. If, due to circumstances not detected by the pilot control device 2 such, for example, as a change in the combustion chamber temperature, the operating point reaches the defined minimum distance to the knocking limit, the output of the diesel gas engine 12*a* is also limited in two steps. Then, if the operating point is still located near or at the knocking limit, the engine 12*a* is stopped.

According to a further optional embodiment, the gas engine 12*a* is a diesel gas engine, which can be operated in diesel/gas two-fuel operation. In this case, the control system 100 according to the invention is embodied in such a way that, when the engine operating point reaches a defined minimum distance to the limits of the operating range or these limits themselves, the diesel/gas engine 12*a* is switched from two-fuel operation to pure diesel operation by a switch 55. Moreover, as in the preferred embodiment, a knock regulating device 4 has priority over the pilot control device 2.

Furthermore, this embodiment also comprises sensors to measure the pressure and temperature before the compressor and sensors to measure the air humidity and gas temperature, which are sensors assigned to the pilot control device and the knock monitoring device and generate input signals for these.

The invention is not limited by the embodiments described above which are presented as examples only but can be modified in various ways within the scope of protection defined by the appended patent claims.

We claim:

1. A combination including an engine and a control system for controlling said engine in response to changing limiting conditions, said control system comprising:
   a pilot control device having sensors for measuring the limiting conditions;
   activators for calculating output signals in response to the limiting conditions;
   a final control device connected to said engine for adjusting an operating point of said engine in response to said output signals, said pilot control device operatively connected such that said engine operating point is not moved closer to the limits of the operating range than a minimum distance; and
   a knock monitoring device operatively connected to said engine for one of adjusting an output of said engine and stopping said engine when said operating point reaches the minimum distance to the limits of the operating range.

2. The combination of claim 1, wherein said sensors comprise a methane monitor for sensing an amount of methane and a temperature sensor for sensing one of a charging air temperature and a mixture temperature.

3. The combination of claim 2, wherein said pilot control device calculates a first output signal for the ignition timepoint and a second output signal for the air-fuel ratio (λ) in dependence on the amount of methane detected by said methane monitor and a third output signal for the output limit of said gas engine in dependence on said one of a charging air temperature and a mixture temperature.

4. The combination of claim 1, further comprising signal generators for generating target values for said activators, wherein said activators activate said pilot control device and said final control device in response to said target values.

5. The combination of claim 4, wherein said activators comprise an ignition timepoint adjustment activator via which the signal for an ignition timepoint activates an ignition timepoint final control device, a λ-control device via which the signal for the air-fuel ratio λ activates a bypass flap, and an output control device via which the signal for the output limit of the gas engine activates a gas jet.

6. The combination of claim 1, wherein said knock monitoring device comprises a temperature sensor operatively connected to said gas engine for measuring a combustion chamber temperature and a knocking sensor operatively connected to said gas engine for monitoring data on a knocking state of the engine and transmitting said data to said knock monitoring device.

7. The combination of claim 6, wherein said data on a knocking state of the engine comprises one of a combustion chamber temperature, solid-borne sound signals, and combustion chamber pressure evaluations.

8. The combination of claim 6, wherein said knock monitoring device is operatively connected for calculating an output limit signal in dependence on said data on a knocking state, and producing a stop signal when a defined maximum combustion chamber temperature is exceeded.

9. The combination of claim 8, wherein said output limit signal comprises a target value for an output control device for activating a gas jet.

10. The combination of claim 1, wherein said engine comprises a diesel gas engine that is operable in diesel/gas two-fuel operation and said pilot control device is operatively connected for switching said engine from the two-fuel operation to a diesel operation when the engine operating point reaches the defined minimum distance to the limits of the operating range.

* * * * *